US012712242B2

(12) United States Patent
Yoshinari et al.

(10) Patent No.: US 12,712,242 B2
(45) Date of Patent: Aug. 18, 2026

(54) SEPARATION MEMBRANE WITH SUB-NANOMETER PORE SIZE, AND LITHIUM ION SECONDARY BATTERY INCLUDING THE SAME

(71) Applicant: LG ENERGY SOLUTION, LTD., Seoul (KR)

(72) Inventors: Yasuhiko Yoshinari, Tokyo (JP); Masayo Horikawa, Tokyo (JP); Hiroki Mikuni, Tokyo (JP); Akihiro Orita, Tokyo (JP); Naoto Kuroda, Tokyo (JP)

(73) Assignee: LG ENERGY SOLUTION, LTD., Seoul (KR)

( * ) Notice: Subject to any disclaimer, the term of this patent is extended or adjusted under 35 U.S.C. 154(b) by 620 days.

(21) Appl. No.: 17/998,158

(22) PCT Filed: Nov. 18, 2020

(86) PCT No.: PCT/JP2020/043046

§ 371 (c)(1), (2) Date: Nov. 8, 2022

(87) PCT Pub. No.: WO2022/107255

PCT Pub. Date: May 27, 2022

(65) Prior Publication Data

US 2023/0178855 A1 Jun. 8, 2023

(51) Int. Cl.

*H01M 50/46* (2021.01)
*H01M 10/0525* (2010.01)
*H01M 50/414* (2021.01)

(52) U.S. Cl.

CPC ....... *H01M 50/46* (2021.01); *H01M 10/0525* (2013.01); *H01M 50/414* (2021.01)

(58) Field of Classification Search

CPC . H01M 50/414; H01M 50/46; H01M 10/0525

(Continued)

(56) References Cited

U.S. PATENT DOCUMENTS 6,534,214 B1 * 3/2003 Nishijima ............. H01M 4/622 429/212
7,112,389 B1 9/2006 Arora et al.

(Continued)

FOREIGN PATENT DOCUMENTS

CN 101273482 A 9/2008
CN 109804496 A 5/2019

(Continued)

OTHER PUBLICATIONS

"Different." In New Oxford American Dictionary, edited by Stevenson, Angus, and Christine A. Lindberg. : Oxford University Press, 2010. https://www.oxfordreference.com/view/10.1093/acref/9780195392883.001.0001/m_en_us1240277. (Year: 2010).*

(Continued)

*Primary Examiner* — Sean P Cullen

(74) *Attorney, Agent, or Firm* — Bryan Cave Leighton Paisner LLP

(57) ABSTRACT

A lithium ion secondary battery containing: a positive electrode mixture layer; a separation membrane; and a negative electrode mixture layer, in this order, wherein the positive electrode mixture layer contains a positive electrode active material, a first lithium salt, and a first solvent, the negative electrode mixture layer contains a negative electrode active material, a second lithium salt, and a second solvent different from the first solvent, and the separation membrane contains pores having an average pore size of 2 Å or greater and less than 20 Å.

3 Claims, 2 Drawing Sheets

(58) Field of Classification Search
USPC ............................ 429/231.95, 254, 188, 326
See application file for complete search history.

(56) References Cited

U.S. PATENT DOCUMENTS

| | | | | |
|---|---|---|---|---|
| 2005/0042515 | A1* | 2/2005 | Hwang ............. | H01M 10/0565 429/231.95 |
| 2005/0074675 | A1* | 4/2005 | Nishijima ......... | H01M 10/0565 429/317 |
| 2007/0218371 | A1 | 9/2007 | Elliott et al. | |
| 2008/0070103 | A1* | 3/2008 | Lin ....................... | H01M 4/139 29/730 |
| 2012/0164513 | A1 | 6/2012 | Peng et al. | |
| 2015/0207122 | A1 | 7/2015 | Yoshitomi | |
| 2019/0229318 | A1 | 7/2019 | Xiao et al. | |
| 2019/0348657 | A1 | 11/2019 | Frischmann et al. | |
| 2019/0348705 | A1 | 11/2019 | Chen et al. | |
| 2020/0358129 | A1 | 11/2020 | Chen et al. | |
| 2023/0085181 | A1 | 3/2023 | Tan et al. | |
| 2023/0102962 | A1 | 3/2023 | Summey et al. | |
| 2023/0131565 | A1 | 4/2023 | Frischmann et al. | |

FOREIGN PATENT DOCUMENTS

| | | | | |
|---|---|---|---|---|
| CN | 111712942 | A | | 9/2020 |
| JP | H10162860 | A | | 6/1998 |
| JP | 2001-110447 | | | 4/2001 |
| JP | 2002-280070 | | | 9/2002 |
| JP | 2007141520 | A | | 6/2007 |
| JP | 2010-232006 | A | | 10/2010 |
| JP | 2012-146492 | | | 8/2012 |
| JP | 2012146492 | A | * | 8/2012 |
| JP | 2016511521 | A | | 4/2016 |
| JP | 2019-535115 | | | 12/2019 |
| JP | 2020-170673 | A | | 10/2020 |
| KR | 10-2005-0023123 | A | | 3/2005 |
| KR | 10-2017-0003212 | A | | 1/2017 |
| KR | 10-2019-0057364 | A | | 5/2019 |
| TW | 201907602 | A | | 2/2019 |

OTHER PUBLICATIONS

International Search Report dated Feb. 9, 2021 for PCT/JP2020/043046.

* cited by examiner

SEPARATION MEMBRANE WITH SUB-NANOMETER PORE SIZE, AND LITHIUM ION SECONDARY BATTERY INCLUDING THE SAME

CROSS-REFERENCE TO RELATED APPLICATIONS

This application is a 35 U.S.C. § 371 national phase application of PCT/JP2020/043046, filed on Nov. 18, 2020.

TECHNICAL FIELD

The present invention relates to a lithium ion secondary battery and a separation membrane.

BACKGROUND ART

In recent years, due to the widespread of portable electronic equipment, electric cars or the like, further enhancement of performance has been required of secondary batteries represented by lithium ion secondary batteries. For example, investigations have been conducted to enhance the performance of lithium ion secondary batteries by incorporating electrolytes of mutually different kinds into the positive electrode and the negative electrode (for example, Patent Literature 1).

CITATION LIST

Patent Literature

Patent Literature 1: Japanese Unexamined Patent Publication No. 2001-110447

SUMMARY OF INVENTION

Technical Problem

With regard to a lithium ion secondary battery in which mutually different kinds of electrolytes are incorporated into the positive electrode and the negative electrode, it is important that the solvents contained in the electrolytes are sufficiently separated without being mixed with each other between the positive electrode and the negative electrode. The inventors of the present invention thought of disposing a separation membrane between the positive electrode and the negative electrode in order to separate the solvents in the electrolytes in such a lithium ion secondary battery. This separation membrane requires a characteristic that lithium ions can pass through the separation membrane whereas solvents cannot easily pass through the separation membrane.

It is an object of the present invention to provide a separation membrane that is used for a lithium ion secondary battery containing mutually different solvents in a positive electrode mixture layer and a negative electrode mixture layer, the separation membrane having an excellent separation capacity for these solvents, and a lithium ion secondary battery containing the separation membrane.

Solution to Problem

The inventors of the present invention found that the solvents contained in a positive electrode mixture layer and a negative electrode mixture layer can be effectively separated by a separation membrane having pores whose average pore size is adjusted to a specific range, thus completing the present invention.

An aspect of the present invention provides a lithium ion secondary battery containing: a positive electrode mixture layer; a separation membrane; and a negative electrode mixture layer, in this order, wherein the positive electrode mixture layer contains a positive electrode active material, a first lithium salt, and a first solvent, the negative electrode mixture layer contains a negative electrode active material, a second lithium salt, and a second solvent different from the first solvent, and the separation membrane contains pores having an average pore size of 2 Å or greater and less than 20 Å.

Another aspect of the present invention provides a separation membrane containing pores having an average pore size of 2 Å or greater and less than 20 Å, wherein the separation membrane is for being disposed in a lithium ion secondary battery containing: a positive electrode mixture layer containing a positive electrode active material, a first lithium salt, and a first solvent; and a negative electrode mixture layer containing a negative electrode active material, a second lithium salt, and a second solvent different from the first solvent, and wherein the separation membrane is for being disposed between the positive electrode mixture layer and the negative electrode mixture layer.

The separation membrane may contain a polymerization product of a compound having two or more polymerizable groups, and a lithium ion-conductive compound having at least one group selected from the group consisting of a carbonyl group and a chain ether group, the polymerization product has a weight average molecular weight of 800 or more, and the lithium ion-conductive compound has a molecular weight of 150 or less.

The separation membrane may contain a crosslinked product of polymers each having a group represented by the following formula (1):

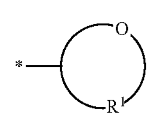

(1)

wherein $R^1$ represents an alkylene group having 1 to 6 carbon atoms, and the symbol * represents a linking bond.

With regard to the above-described lithium ion secondary battery, each of the first solvent and the second solvent has a molecular size of 20 Å or greater.

Advantageous Effects of Invention

According to the present invention, a separation membrane to be used in a lithium ion secondary battery containing mutually different solvents in a positive electrode mixture layer and a negative electrode mixture layer, the separation membrane having an excellent separation capacity for these solvents, and a lithium ion secondary battery containing this separation membrane can be provided.

DESCRIPTION OF EMBODIMENTS

In the following description, embodiments of the present invention will be described with appropriate reference to the drawings. However, the present invention is not intended to be limited to the following embodiments.

According to the present specification, (meth)acrylic acid means acrylic acid or methacrylic acid corresponding thereto. The same also applies to other similar expressions such as (meth)acrylate.

Figure 1:
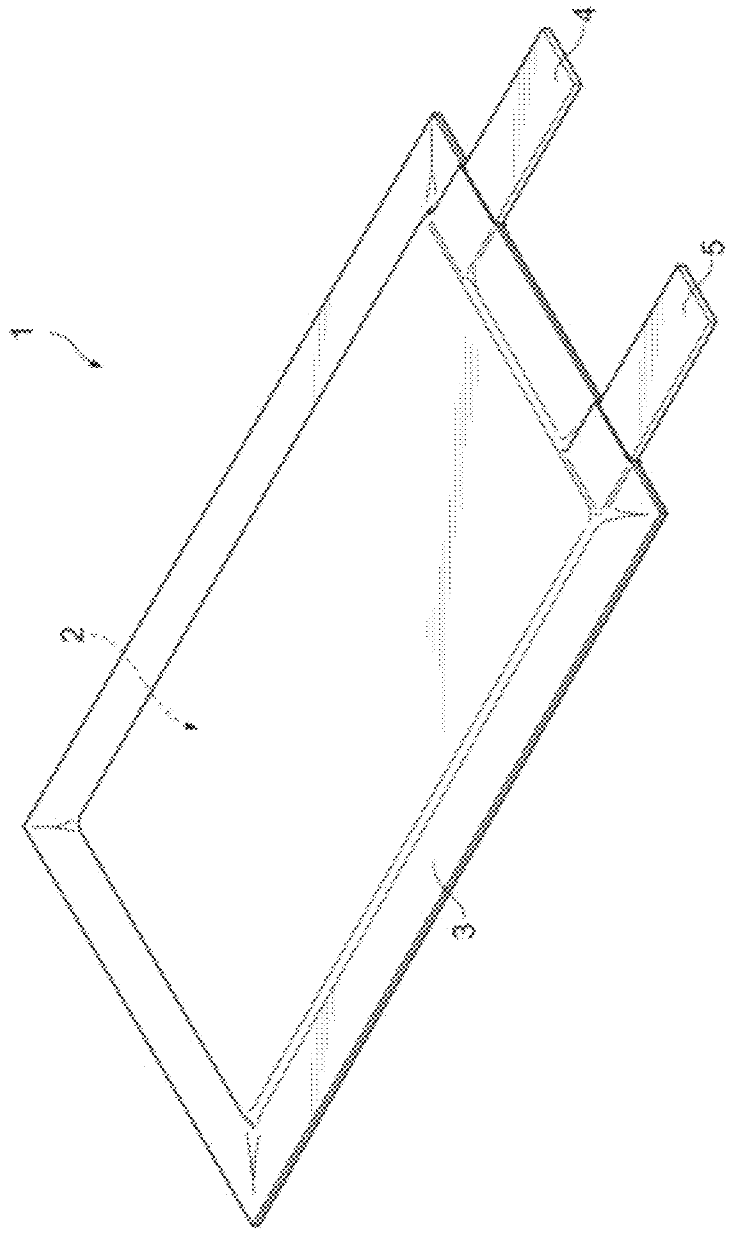
FIG. 1 is a perspective view illustrating a lithium ion secondary battery according to an embodiment.

FIG. 1 is a perspective view illustrating a lithium ion secondary battery according to an embodiment. As shown in FIG. 1, a lithium ion secondary battery 1 according to an embodiment is a so-called laminated secondary battery that contains an electrode group 2 and a bag-shaped battery outer package 3 housing the electrode group 2. The electrode group 2 is provided with a positive electrode current collecting tab 4 and a negative electrode current collecting tab 5. The positive electrode current collecting tab 4 and the negative electrode current collecting tab 5 protrude from the inside of the battery outer package 3 to the outside such that the positive electrode current collector and the negative electrode current collector (details will be described below) are each electrically connectable to the outside of the lithium ion secondary battery 1. According to another embodiment, the lithium ion secondary battery 1 may have a shape other than the laminated type (a coin type, a cylindrical type, or the like).

The battery outer package 3 may be, for example, a container formed from a laminated film. The laminated film may be, for example, a laminated film in which a polymer film such as a polyethylene terephthalate (PET) film, a metal foil such as aluminum, copper, or stainless steel, and a sealant layer such as polypropylene are laminated in this order.

Figure 2:
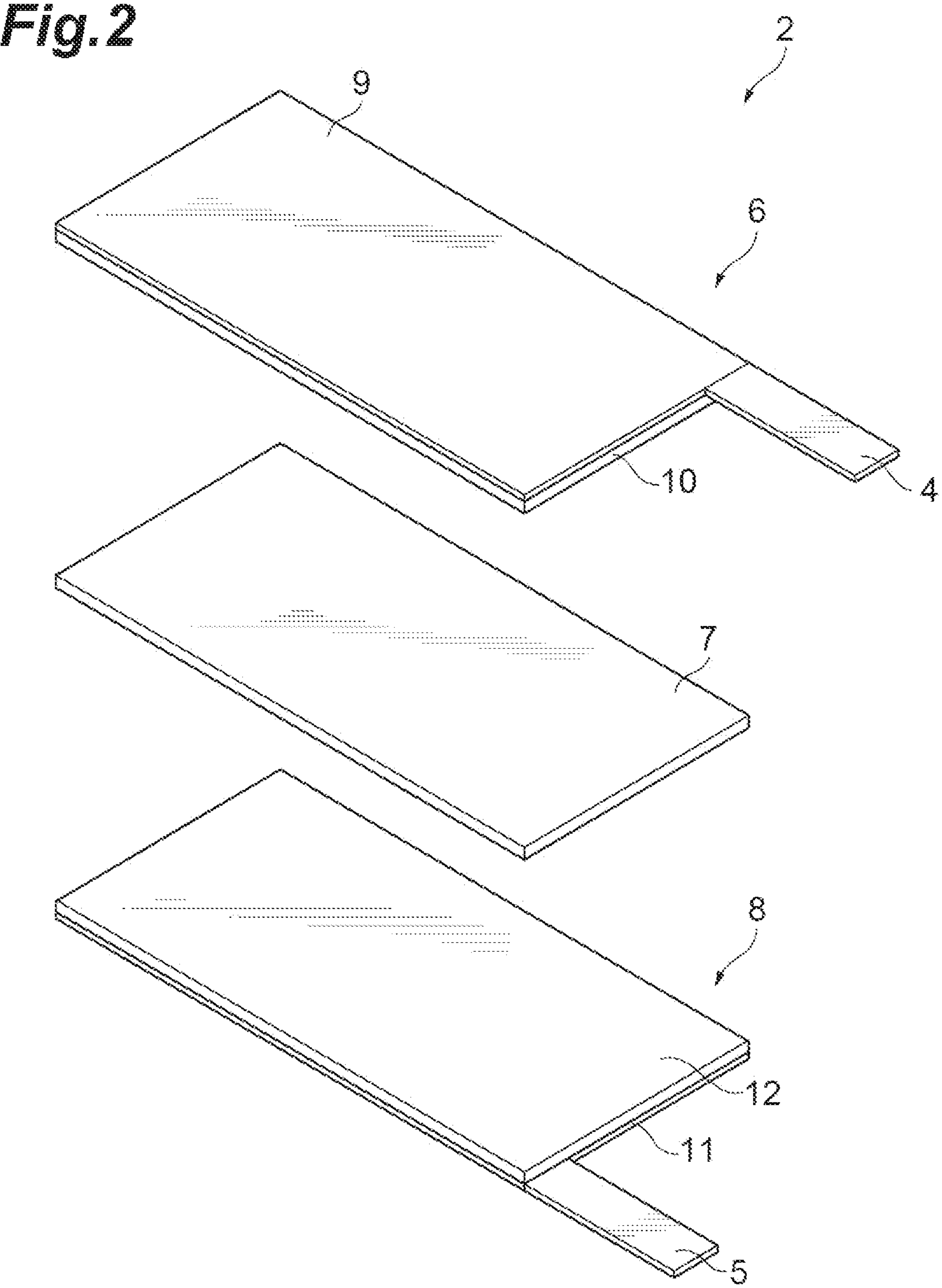
FIG. 2 is an explosive perspective view illustrating an embodiment of an electrode group in the lithium ion secondary battery shown in FIG. 1.

FIG. 2 is an explosive perspective view illustrating an embodiment of the electrode group 2 in the lithium ion secondary battery 1 shown in FIG. 1. As shown in FIG. 2, the electrode group 2 according to the present embodiment contains a positive electrode 6, a separation membrane 7, and a negative electrode 8 in this order. The positive electrode 6 contains a positive electrode current collector 9 and a positive electrode mixture layer 10 provided on the positive electrode current collector 9. The positive electrode current collector 9 is provided with the positive electrode current collecting tab 4. The negative electrode 8 contains a negative electrode current collector 11 and a negative electrode mixture layer 12 provided on the negative electrode current collector 11. The negative electrode current collector 11 is provided with the negative electrode current collecting tab 5.

The positive electrode current collector 9 is made of, for example, aluminum, titanium, stainless steel, nickel, baked carbon, a conductive polymer, or a conductive glass. The thickness of the positive electrode current collector 9 may be, for example, 1 μm or more and may be 50 μm or less.

The negative electrode current collector 11 is made of, for example, copper, stainless steel, nickel, aluminum, titanium, baked carbon, a conductive polymer, a conductive glass, or an aluminum-cadmium alloy. The thickness of the negative electrode current collector 11 may be, for example, 1 μm or more and may be 50 μm or less.

According to an embodiment, the positive electrode mixture layer 10 contains a positive electrode active material, a lithium salt (first lithium salt), and a solvent (first solvent).

The positive electrode active material may be, for example, a lithium oxide. Examples of the lithium oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$ (in each formula, M represents at least one element selected from the group consisting of Na, Mg, Sc, Y, Mn, Fe, Co, Cu, Zn, Al, Cr, Pb, Sb, V, and B (provided that M is an element different from the other elements in each formula); x=0 to 1.2, y=0 to 0.9, and z=2.0 to 2.3). The lithium oxide represented by $Li_xNi_{1-y}M_yO_z$ may be $Li_xNi_{1-(y1+y2)}Co_{y1}Mn_{y2}O_z$ (provided that x and z are similar to those mentioned above; y1=0 to 0.9, y2=0 to 0.9; and y1+y2=0 to 0.9), and examples include $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$, or $LiNi_{0.8}Co_{0.1}Mn_{0.1}O_2$. The lithium oxide represented by $Li_xNi_{1-y}M_yO_z$ may be $Li_xNi_{1-(y3+y4)}Co_{y3}Al_{y4}O_z$ (provided that x and z are similar to those mentioned above; y3=0 to 0.9, y4=0 to 0.9; and y3+y4=0 to 0.9), and may be, for example, $LiNi_{0.8}Co_{0.15}Al_{0.05}O_2$.

The positive electrode active material may be a phosphate of lithium. Examples of the phosphate of lithium include lithium manganese phosphate ($LiMnPO_4$), lithium iron phosphate ($LiFePO_4$), lithium cobalt phosphate ($LiCoPO_4$), and lithium vanadium phosphate ($Li_3V_2(PO_4)_3$). The above-mentioned positive electrode active materials are used singly or in combination of two or more kinds thereof.

The content of the positive electrode active material may be 70% by mass or more, 80% by mass or more, or 85% by mass or more, based on the total amount of the positive electrode mixture layer. The content of the positive electrode active material may be 95% by mass or less, 92% by mass or less, or 90% by mass or less, based on the total amount of the positive electrode mixture layer.

The first lithium salt may be, for example, at least one selected from the group consisting of $LiPF_6$, $LiBF_4$, $LiClO_4$, $LiNO_3$, $LiB(C_6H_5)_4$, $LiCH_3SO_3$, $CF_3SO_2OLi$, $LiN(SO_2F)_2$ (LiFSI, lithium bisfluorosulfonylimide), $LiN(SO_2CF_3)_2$ (LiTFSI, lithium bistrifluoromethanesulfonylimide), and $LiN(SO_2CF_2CF_3)_2$.

The content of the first lithium salt may be 0.5 mol/L or more, 0.7 mol/L or more, or 0.8 mol/L or more, and may be 1.5 mol/L or less, 1.3 mol/L or less, or 1.2 mol/L or less, based on the total amount of the first solvent.

The first solvent is a solvent for dissolving the first lithium salt. The first solvent is preferably a compound having a molecular size of 20 Å or greater. As a result, in the lithium ion secondary battery 1, the first solvent and the second solvent that will be described below can be made easily separable by the separation membrane 7.

From the viewpoint of making the separation of solvents by the separation membrane 7 easier, the molecular size of the first solvent is preferably 20 Å or greater, more preferably 25 Å or greater, and even more preferably 30 Å or greater. From the viewpoint of the ease of stirring at the time of dissolving the lithium salt, the molecular size of the first solvent is preferably 100 Å or less, more preferably 90 Å or less, and even more preferably 80 Å or less.

The molecular size of the first solvent can be obtained by determining the most stable structure of the solvent by the density functional theory (DFT), which is one type of quantum chemical calculation, and calculating the molecular size based on the theoretical bond length therefrom.

Examples of the first solvent having a molecular size of 20 Å or greater include a glyme represented by the following formula (2):

$$R^{21}O-(CH_2CH_2O)_{k1}-R^{22} \quad (2)$$

wherein $R^{21}$ and $R^{22}$ each independently represent an alkyl group having 1 to 4 carbon atoms, and k1 represents an integer of 4 to 6, and a fluorinated phosphoric acid ester such as tris(1H,1H,5H-octafluoropentyl) phosphate.

More specifically, the glyme may be tetraglyme (k1=4), pentaglyme (k1=5), or hexaglyme (k1=6).

In addition to the above-mentioned solvents, the first solvent may be a cyclic carbonate such as ethylene carbonate, propylene carbonate, vinylene carbonate, vinyl ethylene carbonate, fluoroethylene carbonate, or difluoroethylene carbonate; a chain carbonate such as dimethyl carbonate, diethyl carbonate, or ethyl methyl carbonate; a cyclic ester such as γ-butyrolactone, γ-valerolactone, δ-valerolactone, ε-caprolactone, or γ-hexanolactone; tetrahydrofuran, 1,3-dioxane, dimethoxyethane, diethoxyethane, methoxyethoxyethane; a phosphoric acid ester such as a phosphoric acid triester; a nitrile such as acetonitrile, benzonitrile, adiponitrile, or glutaronitrile; a chain sulfone such as dimethylsulfone or diethylsulfone; a cyclic sulfone such as sulfolane; a cyclic sulfonic acid ester such as propanesultone; or the like. From the viewpoint of increasing the oxidation resistance of the positive electrode mixture layer 10, the first solvent may be a solvent having oxidation resistance, such as acetonitrile or ethylene carbonate.

Regarding the first solvent, the above-mentioned solvents are used singly or in combination of two or more kinds thereof.

The content of the first solvent contained in the positive electrode mixture layer 10 can be appropriately set to the extent that can dissolve the first lithium salt; however, for example, the content may be 10% by mass or more and may be 80% by mass or less, based on the total amount of the positive electrode mixture layer.

The positive electrode mixture layer 10 may further contain a binder and a conductive material as other components.

The binder may be a polymer containing at least one selected from the group consisting of ethylene tetrafluoride, vinylidene fluoride, hexafluoropropylene, acrylic acid, maleic acid, ethyl methacrylate, methyl methacrylate, and acrylonitrile, as a monomer unit; or a rubber such as a styrene-butadiene rubber, an isoprene rubber, or an acrylic rubber. The binder is preferably polyvinylidene fluoride or a copolymer containing hexafluoropropylene and vinylidene fluoride, as monomer units.

The content of the binder may be 0.3% by mass or more, 0.5% by mass or more, 1% by mass or more, or 1.5% by mass or more, and may be 10% by mass or less, 8% by mass or less, 6% by mass or less, or 4% by mass or less, based on the total amount of the positive electrode mixture layer.

The conductive material may be a carbon material such as carbon black, acetylene black, graphite, carbon fibers, or carbon nanotubes, or the like. These conductive materials are used singly or in combination of two or more kinds thereof.

The content of the conductive material may be 0.1% by mass or more, 1% by mass or more, or 3% by mass or more, based on the total amount of the positive electrode mixture layer. From the viewpoint of suppressing an increase in the volume of the positive electrode 6 and a concomitant decrease in the energy density of the lithium ion secondary battery 1, the content of the conductive material is preferably 15% by mass or less, more preferably 10% by mass or less, and even more preferably 8% by mass or less, based on the total amount of the positive electrode mixture layer.

The thickness of the positive electrode mixture layer 10 may be 5 μm or more, 10 μm or more, 15 μm or more, or 20 μm or more, and may be 100 μm or less, 80 μm or less, 70 μm or less, or 50 μm or less.

According to an embodiment, the negative electrode mixture layer 12 contains a negative electrode active material, a lithium salt (second lithium salt), and a solvent (second solvent).

Regarding the negative electrode active material, those commonly used in the field of energy devices can be used. Specific examples of the negative electrode active material include metal lithium, lithium titanate (Li4Ti5O12), a lithium alloy, a metal compound other than the foregoing ones, a carbon material, a metal complex, and an organic polymer compound. These negative electrode active materials are used singly or in combination of two or more kinds thereof Examples of the carbon material include graphite such as natural graphite (flaky graphite and the like) and artificial graphite; amorphous carbon; carbon fibers; and carbon black such as acetylene black, Ketjenblack®, channel black, furnace black, lamp black, and thermal black. From the viewpoint of obtaining a larger theoretical capacity (for example, 500 to 1500 Ah/kg), the negative electrode active material may be a negative electrode active material containing silicon as a constituent element, a negative electrode active material containing tin as a constituent element, or the like. Among these, the negative electrode active material may be a negative electrode active material containing silicon as a constituent element.

The negative electrode active material containing silicon as a constituent element may be an alloy containing silicon as a constituent element and may be, for example, an alloy containing silicon and at least one selected from the group consisting of nickel, copper, iron, cobalt, manganese, zinc, indium, silver, titanium, germanium, bismuth, antimony, and chromium, as constituent elements. The negative electrode active material containing silicon as a constituent element may be an oxide, a nitride, or a carbide, and specific examples include silicon oxides such as SiO, $SiO_2$, and LiSiO; silicon nitrides such as $Si_3N_4$ and $Si_2N_2O$; and silicon carbides such as SiC.

The content of the negative electrode active material may be 60% by mass or more, 65% by mass or more, or 70% by mass or more, based on the total amount of the negative electrode mixture layer. The content of the negative electrode active material may be 99% by mass or less, 95% by mass or less, or 90% by mass or less, based on the total amount of the negative electrode mixture layer.

The type and the content of the second lithium salt may be similar to those of the first lithium salt contained in the above-mentioned positive electrode mixture layer 10. The second lithium salt may be of the same kind as the first lithium salt or may be of different kinds.

The second solvent is a solvent for dissolving the second lithium salt. Regarding the second solvent, a solvent similar to that used as the above-mentioned first solvent can be used; however, a solvent different from the first solvent is used. As a result, since solvents respectively suitable for the positive electrode 6 and the negative electrode 8 can be used, various performances of the lithium ion secondary battery 1, such as the energy density and the life prolongation, can be enhanced.

The second solvent is preferably a compound having a molecular size of 20 Å or greater. Specific examples of the solvent having a molecular size of 20 Å or greater are as described above. From the viewpoint of suppressing reductive decomposition of the second solvent contained in the negative electrode mixture layer 12, the second solvent may be a solvent having reduction resistance, such as γ-butyrolactone or tetrahydrofuran. Regarding the second solvent, the above-mentioned solvents are used singly or in combination of two or more kinds thereof.

The content of the second solvent contained in the negative electrode mixture layer 12 can be appropriately set to the extent that can dissolve the second lithium salt; however, for example, the content may be 10% by mass or more and may be 80% by mass or less, based on the total amount of the negative electrode mixture layer.

The negative electrode mixture layer 12 may further contain a binder and a conductive material as other components. The types and the contents of the binder and the conductive material may be similar to the types and the contents of the binder and the conductive material in the above-mentioned positive electrode mixture layer 10.

The thickness of the negative electrode mixture layer 12 may be 10 μm or more, 15 μm or more, or 20 μm or more, and may be 100 μm or less, 80 μm or less, 70 μm or less, 50 μm or less, 40 μm or less, or 30 μm or less.

The separation membrane 7 is a separation membrane for being disposed between the positive electrode mixture layer 10 and the negative electrode mixture layer 12 in the lithium ion secondary battery 1. This separation membrane 7 plays the role of separating the first solvent and the second solvent contained in the positive electrode mixture layer 10 and the negative electrode mixture layer 12 from each other and preventing the respective solvents from mixing with each other. It is possible to conduct delivery and acceptance of lithium ions through the separation membrane 7.

The separation membrane 7 is a porous body having a porous structure and has pores having an average pore size of 2 Å or greater and less than 20 Å.

From the viewpoint that the movement of lithium ions is less likely to be inhibited, the average pore size of the separation membrane 7 is 2 Å or greater, preferably 5 Å or greater, more preferably 7 Å or greater, and even more preferably 10 Å or greater. From the viewpoint of further increasing the separation capacity of the solvent, the average pore size of the separation membrane 7 is less than 20 Å, preferably 18 Å or less, more preferably 15 Å or less, and even more preferably 13 Å or less. The average pore size of the separation membrane 7 can be measured by a gas adsorption method of using argon gas, and more specifically, the average pore size can be calculated from the amount of adsorption of argon gas adsorbed to the pores of the separation membrane 7.

According to an embodiment (first embodiment), the separation membrane 7 having the above-mentioned average pore size is a separation membrane which contains a polymerization product of a compound having two or more polymerizable groups and a lithium ion-conductive compound having at least one group selected from the group consisting of a carbonyl group and a chain ether group, and in which the weight average molecular weight of the polymerization product is 800 or more, and the molecular weight of the lithium ion-conductive compound is 150 or less. With regard to this separation membrane, the average pore size of the separation membrane 7 can be adjusted to be 2 Å or greater and less than 20 Å by adjusting the weight average molecular weight of the polymerization product and the molecular weight of the lithium ion-conductive compound to the above-described ranges.

The polymerizable group in the compound having two or more polymerizable groups (hereinafter, also referred to as "polymerizable compound") is, for example, a group containing an ethylenically unsaturated bond. The polymerizable group may be a radical-polymerizable group and may be a vinyl group, an allyl group, a styryl group, an alkenyl group, an alkenylene group, a (meth)acryloyl group, a maleimide group, or the like.

According to an embodiment, the polymerizable compound may be a polyfunctional (meth)acrylate (poly(meth) acrylate). The polyfunctional (meth)acrylate may be a polyalkylene glycol di(meth)acrylate such as polyethylene glycol di(meth)acrylate.

With regard to the separation membrane of the first embodiment, the weight average molecular weight of the polymerization product of the polymerizable compound is 800 or more. From the viewpoint of increasing the average pore size of the separation membrane 7 in the range of 2 Å or greater and less than 20 Å, the weight average molecular weight of the polymerization product is preferably 900 or more, 1000 or more, 3000 or more, 5000 or more, 7000 or more, or 9000 or more. From the viewpoint of decreasing the average pore size of the separation membrane 7 in the range of 2 Å or greater and less than 20 Å, the weight average molecular weight of the polymerization product is preferably 200000 or less, more preferably 100000 or less, and even more preferably 50000 or less. The weight average molecular weight is a value obtained by making measurement by a gel permeation chromatography (GPC) method and calculating the value relative to a calibration curve of polystyrene standards (hereinafter, the same).

From the viewpoint of the strength of the membrane, the content of the polymerization product of the polymerizable compound is preferably 5% by mass or more, more preferably 15% by mass or more, and even more preferably 30% by mass or more, based on the total amount of the separation membrane. From the viewpoint that the movement of lithium ions is less likely to be inhibited, the content of the polymerization product of the polymerizable compound is preferably 95% by mass or less, more preferably 85% by mass or less, and even more preferably 80% by mass or less, based on the total amount of the separation membrane.

The lithium ion-conductive compound means a compound having lithium ion conductivity and means a compound having a property in which, in the presence of a lithium salt, lithium ions derived from the lithium salt can be conducted. Whether the compound can conduct lithium ions can be checked by measuring the ion conductivity against the compound, and when the peak of ion conductivity measured when 1% to 40% by mass of a lithium salt is added against the compound is $1\times10^{-6}$ S/cm or more, the compound can be said to be a compound having lithium ion conductivity.

The lithium ion-conductive compound has at least one group selected from the group consisting of a carbonyl group and a chain ether group.

According to an embodiment, the lithium ion-conductive compound having at least one group selected from the group consisting of a carbonyl group and a chain ether group may be a carbonate, such as a chain carbonate such as dimethyl carbonate, diethyl carbonate, or ethyl methyl carbonate.

According to another embodiment, the lithium ion-conductive compound having at least one group selected from the group consisting of a carbonyl group and a chain ether group may be a glyme represented by the following formula (3):

$$R^{23}O—(CH_2CH_2O)_{k2}—R^{24} \quad (3)$$

wherein $R^{23}$ and $R^{24}$ each independently represent an alkyl group having 1 to 4 carbon atoms, and k2 represents an integer of 1 to 6.

More specifically, the glyme may be monoglyme (k2=1), diglyme (k2=2), triglyme (k2=3), tetraglyme (k2=4), pentaglyme (k2=5), or hexaglyme (k2=6).

For the separation membrane of the first embodiment, the molecular weight of the lithium ion-conductive compound is 150 or less. From the viewpoint of increasing the average pore size of the separation membrane 7 in the range of 2 Å or greater and less than 20 Å, the molecular weight of the lithium ion-conductive compound is preferably 10 or more, more preferably 20 or more, and even more preferably 30 or more. From the viewpoint of decreasing the average pore size of the separation membrane 7 in the range of 2 Å or greater and less than 20 Å, the molecular weight of the lithium ion-conductive compound is preferably 145 or less, more preferably 140 or less, and even more preferably 135 or less.

From the viewpoint of further increasing the ion conductivity of the separation membrane 7, the content of the lithium ion-conductive compound is preferably 5% by mass or more, more preferably 10% by mass or more, and even more preferably 15% by mass or more, based on the total amount of the separation membrane. From the viewpoint of the film-forming property, the content of the lithium ion-conductive compound is preferably 90% by mass or less, more preferably 80% by mass or less, and even more preferably 70% by mass or less, based on the total amount of the separation membrane.

The separation membrane according to the first embodiment may further contain a lithium salt (third lithium salt), a polymerization initiator, and the like as other components. Regarding the third lithium salt, a salt similar to the above-mentioned first lithium salt can be used. The third lithium salt may be of the same kind as the above-mentioned first lithium salt and second lithium salt or may be of different kinds.

The content of the third lithium salt may be 1% by mass or more, 1.5% by mass or more, or 2% by mass or more, and may be 30% by mass or less, 25% by mass or less, or 20% by mass or less, based on the total amount of the separation membrane. The content of the polymerization initiator may be 0.1% by mass or more and may be 10% by mass or less, based on the total amount of the separation membrane.

According to another embodiment (second embodiment), the separation membrane 7 having the above-mentioned average pore size is a separation membrane containing a crosslinked product of the molecules of a polymer having a group represented by the following formula (1):

(1)

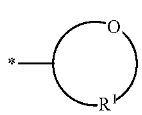

wherein $R^1$ represents an alkylene group having 1 to 6 carbon atoms; and the symbol * represents a linking bond. With regard to this separation membrane, as a polymer having a group represented by the formula (1) is crosslinked by using lithium ions present in the lithium ion secondary battery 1 or in the separation membrane 7 as initiators, the groups represented by the formula (1) are bonded, and pores having the above-mentioned average pore size are formed. The average pore size of the separation membrane 7 can be adjusted by adjusting the number of carbon atoms represented by $R^1$ in the formula (1).

The polymer having a group represented by the formula (1) may be, for example, a polymer represented by the following formula (4):

(4)

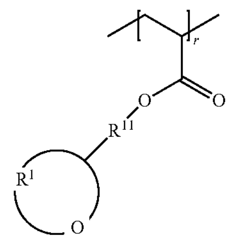

wherein $R^1$ has the same meaning as $R^1$ in the formula (1), $R^{11}$ represents a linear or branched alkylene group or a single bond, and r represents an integer of 2 or greater.

In the formula (1) or formula (4), the number of carbon atoms of the alkylene group represented by $R^1$ is preferably 2 or more or 3 or more from the viewpoint of increasing the average pore size of the separation membrane in the range of 2 Å or greater and less than 20 Å, and the number of carbon atoms is preferably 5 or less or 4 or less from the viewpoint of decreasing the average pore size of the separation membrane 7 in the range of 2 Å or greater and less than 20 Å.

In the formula (4), the number of carbon atoms of the alkylene group represented by $R^{11}$ may be, for example, 2 or more and may be 5 or less. r may be, for example, 5 or more and may be 20 or less.

Examples of the polymer having a group represented by the formula (1) include polyglycidyl (meth)acrylate and poly(3-ethyloxetan-3-yl)methyl (meth)acrylate.

The weight average molecular weight of the polymer having a group represented by the formula (1) may be 900 or more, 1000 or more, or 3000 or more and may be 200000 or less, 100000 or less, or 50000 or less.

From the viewpoint of the strength of the membrane, the content of the crosslinked product of the molecules of the polymer having a group represented by the formula (1) is preferably 5% by mass or more, more preferably 15% by mass or more, and even more preferably 30% by mass or more, based on the total amount of the separation membrane. From the viewpoint that the movement of lithium ions is less likely to be inhibited, the content of this crosslinked product is preferably 95% by mass or less, more preferably 85% by mass or less, and even more preferably 80% by mass or less, based on the total amount of the separation membrane.

The separation membrane according to the second embodiment may further contain a lithium salt (third lithium salt), a polymerization initiator, and the like as other components. The types of the third lithium salt and the polymerization initiator and the contents thereof in the separation membrane 7 may be similar to those in the case of the above-mentioned separation membrane according to the first embodiment.

From the viewpoint of further enhancing the separation capacity of the separation membrane 7, the thickness of the separation membrane 7 according to the embodiment described above is preferably 100 μm or more, 200 μm or more, or 500 μm or more. From the viewpoint of increasing the energy density of the separation membrane 7, the thickness of the separation membrane 7 is preferably 800 μm or less, 600 μm or less, or 400 μm or less.

Subsequently, the method for producing the lithium ion secondary battery 1 will be described. The method for producing the lithium ion secondary battery 1 according to an embodiment contains a step of obtaining the positive electrode 6 containing the positive electrode mixture layer 10 containing a positive electrode active material, a first lithium salt, and a first solvent; a step of obtaining the negative electrode 8 containing the negative electrode mixture layer 12 containing a negative electrode active material, a second lithium salt, and a second solvent different from the first solvent; and a step of providing the separation membrane 7 between the positive electrode 6 and the negative electrode 8. The order of each step is arbitrary.

In the above-described production method, specific aspects of the positive electrode active material, the first lithium salt, the first solvent, the negative electrode active material, the second lithium salt, the second solvent, and the separation membrane 7 are as described above.

In the step of obtaining a positive electrode and the step of obtaining a negative electrode, the positive electrode 6 and the negative electrode 8 can be obtained by utilizing a known method. For example, the materials used for the positive electrode mixture layer 10 or the negative electrode mixture layer 12 are dispersed in an appropriate amount of a dispersing medium by using a kneading machine, a dispersing machine, or the like, and a positive electrode mixture or a negative electrode mixture in a slurry form is obtained. Subsequently, this positive electrode mixture or negative electrode mixture is applied on the positive electrode current collector 9 or the negative electrode current collector 11 by a doctor blade method, a dipping method, a spraying method, or the like, and the dispersing medium is volatilized to obtain the positive electrode 6 and the negative electrode 8. At this time, the dispersing medium may be water, N-methyl-2-pyrrolidone (NMP), or the like.

The step of providing the separation membrane 7 between the positive electrode 6 and the negative electrode 8 may contain a step of producing the separation membrane 7. According to an embodiment, the step of producing the separation membrane 7 contains a step of preparing a slurry containing the materials of the separation membrane 7 and forming the slurry into a membrane form.

When the separation membrane 7 is the separation membrane according to the above-mentioned first embodiment, the slurry contains a compound having two or more polymerizable groups (polymerizable compound) and a lithium ion-conductive compound having at least one group selected from the group consisting of a carbonyl group and a chain ether group. The aspects of the polymerizable compound and the lithium ion-conductive compound are as described above.

The slurry may further contain the above-mentioned third lithium salt. The content of the third lithium salt may be 1% by mass or more, 3% by mass or more, or 5% by mass or more, and may be 30% by mass or less, 25% by mass or less, or 20% by mass or less, based on the total amount of the slurry.

The slurry may further contain a polymerization initiator. As a result, the polymerizable compound can be suitably polymerized, and a separation membrane can be suitably produced from the slurry. The polymerization initiator may be a thermal polymerization initiator or a photopolymerization initiator and can be appropriately selected according to the purpose.

Examples of the thermal polymerization initiator include azobisisobutyronitrile and azobis(2-methylbutyronitrile).

Examples of the photopolymerization initiator include 2-hydroxy-2-methyl-1-phenylpropanone and diphenyl(2,4,6-trimethylbenzoyl)phosphine oxide.

The content of the polymerization initiator may be 0.5% by mass or more, 1% by mass or more, 10% by mass or more, or 20% by mass or more, and may be 50% by mass or less, 40% by mass or less, 30% by mass or less, 10% by mass or less, 5% by mass or less, or 3% by mass or less, based on the total amount of the slurry.

The method of forming the slurry into a membrane form is, for example, a method of providing a frame having an arbitrary size on one surface of a base material such as a PET sheet and pouring the slurry into this frame. Alternatively, the slurry may also be formed into a membrane form by applying the slurry on one surface of the base material by a doctor blade method, a dipping method, a spraying method, or the like.

The step of producing the separation membrane 7 may further include a step of forming the slurry into a membrane form and then polymerizing the compound having two or more polymerizable groups contained in the slurry formed into the membrane form. As a result, a separation membrane according to the first embodiment is produced.

The method of polymerizing the polymerizable compound is, when the slurry contains a thermal polymerization initiator, a method of applying heat under specific conditions. The heating temperature may be, for example, 50° C. to 90° C. The heating time may be appropriately adjusted depending on the heating temperature; however, for example, the heating time is 1 minute to 2 hours.

The method of polymerizing the polymerizable compound is, when the slurry contains a photopolymerization initiator, a method of irradiating the polymerizable compound with light under specific conditions. According to an embodiment, the polymerizable compound may be polymerized by irradiating the polymerizable compound with light containing wavelengths in the range of 200 to 400 nm (ultraviolet light).

When the separation membrane 7 is a separation membrane according to the above-mentioned second embodiment, the slurry used in the step of producing the separation membrane 7 may contain the above-mentioned polymer having a group represented by the formula (1).

In this case, the slurry may further contain a third lithium salt and/or a polymerization initiator. The types of the third lithium salt and the polymerization initiator and the contents thereof in the slurry may be similar to those in the case of the separation membrane according to the above-mentioned first embodiment.

The method of forming the slurry into a membrane form may be similar to the case of the separation membrane according to the above-mentioned first embodiment.

When the separation membrane 7 is a separation membrane according to the above-mentioned second embodiment, the step of producing the separation membrane 7 may further contain a step of crosslinking the polymer having a group represented by the formula (1), which is contained in the slurry formed into a membrane form. As a result, a separation membrane according to the second embodiment is produced.

The method of crosslinking the polymer may be carried out by a method similar to the step of polymerizing a compound having two or more polymerizable groups in the step of producing the separation membrane 7 according to the above-mentioned first embodiment. In this case, the lithium salt contained in the slurry works as a crosslinking agent, and the molecules of the polymer having a group represented by the formula (1) are crosslinked to form a crosslinked product.

In the step of providing the separation membrane 7 between the positive electrode 6 and the negative electrode 8, subsequently, the positive electrode 6, the separation membrane 7, and the negative electrode 8 are laminated by, for example, lamination. As a result, the electrode group 2 containing the positive electrode 6, the negative electrode 8, and the separation membrane 7 provided between the positive electrode 6 and the negative electrode 8 can be obtained. Furthermore, this electrode group 2 is housed in the battery outer package 3 to obtain the lithium ion secondary battery 1.

EXAMPLES

Hereinafter, the present invention will be described more specifically by way of Examples; however, the present invention is not intended to be limited to these Examples.

Example 1

6.0 g of a polyethylene glycol diacrylate represented by the following formula (2) (n in the formula=14, trade name: NK ESTER A-600™, manufactured by SHIN-NAKAMURA CHEMICAL Co., Ltd.):

(2)

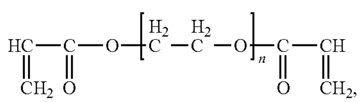

4.0 g of diethyl carbonate (molecular weight 118, manufactured by FUJIFILM Wako Pure Chemical Corp.), 1.4 g of lithium nitrate (manufactured by FUJIFILM Wako Pure Chemical Corp.), and 1.0 g of azobisisobutyronitrile (manufactured by FUJIFILM Wako Pure Chemical Corp.) were mixed to prepare a slurry. A frame made of silicon rubber (4×4 cm, thickness 1 mm) was installed on a sheet made of PET (8×8 cm, thickness 0.035 mm), and the prepared slurry was placed in the frame. Subsequently, the slurry was heated at 60° C. for 1 hour by using a hot plate to polymerize polyethylene glycol diacrylate, and a separation membrane was obtained. The weight average molecular weight (Mw) of the polymerization product of polyethylene glycol diacrylate was 1000. The separation membrane was removed from the frame and was submitted to a test described below.

Example 2

A separation membrane was produced in the same manner as in Example 1, except that the diethyl carbonate used in Example 1 was changed to diglyme (molecular weight 134, manufactured by FUJIFILM Wako Pure Chemical Corp.).

Example 3

A separation membrane was produced in the same manner as in Example 2, except that the amount of addition of azobisisobutyronitrile (manufactured by FUJIFILM Wako Pure Chemical Corp.) used in Example 2 was changed to 0.1 g. The weight average molecular weight of the polymerization product of polyethylene glycol diacrylate was 10000.

Example 4

A separation membrane was produced in the same manner as in Example 1, except that the diethyl carbonate used in Example 1 was changed to monoglyme (molecular weight 32, manufactured by FUJIFILM Wako Pure Chemical Corp.).

Example 5

6.0 g of a polymer represented by the following formula (4-1) (r in the formula ~366, weight average molecular weight 10000):

(4-1)

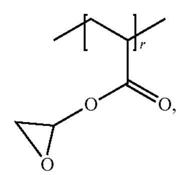

4.0 g of diglyme (manufactured by FUJIFILM Wako Pure Chemical Corp.), 1.4 g of lithium nitrate (manufactured by FUJIFILM Wako Pure Chemical Corp.), and 0.1 g of azobisisobutyronitrile (manufactured by FUJIFILM Wako Pure Chemical Corp.) were mixed to prepare a slurry. A frame made of silicon rubber (4×4 cm, thickness 1 mm) was installed on a sheet made of PET (8×8 cm, thickness 0.035 mm), and the prepared slurry was placed in the frame. Subsequently, the slurry was heated at 60° C. for 1 hour by using a hot plate to crosslink the polymer represented by the formula (4-1), and a separation membrane was obtained. The separation membrane was removed from the frame and was submitted to a test described below.

Comparative Example 1

A separation membrane was produced in the same manner as in Example 1, except that the polyethylene glycol diacrylate used in Example 2 was changed to one having a weight average molecular weight of 250 (manufactured by Sigma-Aldrich Corp.), and the amount of addition of azobisisobutyronitrile (manufactured by FUJIFILM Wako Pure Chemical Corp.) was changed to 2.0 g. The weight average molecular weight of the polymerization product of polyethylene glycol diacrylate was 500. As a result, a film could not be formed, and a separation membrane could not be obtained.

Comparative Example 2

A separation membrane was produced in the same manner as in Example 1, except that the diethyl carbonate used in Example 1 was changed to pentaethylene glycol monomethyl ether (molecular weight 252, manufactured by FUJIFILM Wako Pure Chemical Corp.).

Comparative Example 3

A separation membrane was produced in the same manner as in Example 5, except that the polymer represented by the formula (4-1) used in Example 5 was changed to a polymer represented by the following formula (10) (r in the formula ~364, weight average molecular weight 10000):

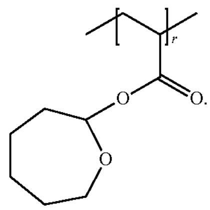

(10)

corresponding to the first solvent and the second solvent) can be evaluated by observing the external appearance of the separator and checking the presence or absence of penetration of tetraglyme into the separator. When there was no penetration of tetraglyme into the separator even after a lapse of one day from the initiation of test, the result is indicated as "≥1 day" in Table 1 and Table 2, and in this case, it can be said that the separation membrane has an excellent solvent separation capacity. On the other hand, in Table 1 and Table 2, when penetration of tetraglyme was observed after a lapse of one day, the result is indicated as "<1 day". As shown in Table 1 and Table 2, in the separation membranes according to the Examples, there was no penetration of tetraglyme into the separator even after a lapse of one day or longer; however, in the separation membranes according to the Comparative Examples, tetraglyme penetrated into the separator after a lapse of one day.

TABLE 1

| | Example 1 | Example 2 | Example 3 | Example 4 | Comparative Example 1 | Comparative Example 2 |
|---|---|---|---|---|---|---|
| Type of compound having two or more polymerizable groups | Polyethylene glycol diacrylate | | | | | |
| Mw of polymerization product | 1000 | | 10000 | 1000 | 500 | 1000 |
| Type of lithium ion-conductive compound | Diethyl carbonate | Diglyme | | Monoglyme | Diglyme | Pentaethylene glycol monomethyl ether |
| Molecular weight of lithium ion-conductive compound | 118 | 134 | | 32 | 134 | 252 |
| Average pore size of separation membrane (Å) | 9 | 11 | | 7 | — | 23 |
| Solvent separation capacity (number of days elapsed) | ≥1 day | | | | — | <1 day |

<Average Pore Size of Separation Membrane>

The average pore sizes of the separation membranes according to the Examples and the Comparative Examples were measured by a gas adsorption method of using argon gas. Specifically, the average pore size was measured by using a nitrogen adsorption measuring apparatus (AUTOSORB-1, manufactured by QUANTACHROME Corp.) and setting the evaluation temperature to 87K, under the conditions in which the evaluation pressure range was set to be less than 1 at the relative pressure (equilibrium pressure with respect to the saturated vapor pressure). As shown in Table 1 and Table 2, the average pore sizes of the separation membranes according to the Examples were all within the range of 2 Å or greater and less than 20 Å; however, the average pore sizes of the separation membranes according to the Comparative Examples were out of the range of 2 Å or greater and less than 20 Å.

<Evaluation of Solvent Separation Capacity>

A separation membrane according to an Example or a Comparative Example and a separator (UP3085, manufactured by Ube Industries, Ltd.) were stacked, these were interposed between two sheets made of silicon rubber (thickness 0.5 mm), and this assembly was disposed in between an H-type cell. Tetraglyme (molecular size 20 Å) was introduced into the cell on the separation membrane side, and the external appearance of the separator after a lapse of specific number of days was observed by visual inspection. When a separation membrane has an excellent solvent separation capacity, since it is difficult for tetraglyme to permeate through the separation membrane, it is difficult for tetraglyme to penetrate into the separator; however, when a separation membrane has a poor solvent separation capacity, tetraglyme permeates through the separation membrane and penetrates into the separator. Therefore, the separation capacity of a separation membrane for a solvent (solvent

TABLE 2

| | Example 5 | Comparative Example 3 |
|---|---|---|
| Type of polymer | Polymer represented by formula (4-1) | Polymer represented by formula (10) |
| Average pore size of separation membrane (Å) | 12 | 24 |
| Solvent separation capacity (number of days elapsed) | ≥1 day | <1 day |

REFERENCE SIGNS LIST

1: lithium ion secondary battery, 2: electrode group, 3: battery outer package, 4: positive electrode current collecting tab, 5: negative electrode current collecting tab, 6: positive electrode, 7: separation membrane, 8: negative electrode, 9: positive electrode current collector, 10: positive electrode mixture layer, 11: negative electrode current collector, 12: negative electrode mixture layer.

The invention claimed is:

1. A lithium ion secondary battery comprising:

a positive electrode mixture layer;

a negative electrode mixture layer; and a separation membrane between the positive electrode mixture layer and the negative electrode mixture layer, wherein the positive electrode mixture layer comprises a positive electrode active material, a first lithium salt, and a first solvent, wherein the negative electrode mixture layer comprises a negative electrode active material, a second lithium salt, and a second solvent that is different in composition from the first solvent, wherein the positive electrode mixture layer does not contain the second solvent and the negative electrode mixture layer does not contain the first solvent, wherein the separation membrane comprises pores having an average pore size of 2 Å or greater and less than 20 Å, wherein each of the first solvent and the second solvent has a molecular size of 20 Å or greater.

2. The lithium ion secondary battery according to claim 1, wherein the separation membrane comprises a crosslinked product of polymers each having a group represented by the following formula (1):

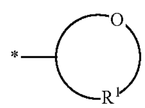

(1)

wherein $R^1$ represents an alkylene group having 1 to 6 carbon atoms, and the symbol represents a linking bond.

3. The lithium ion secondary battery according to claim 1, wherein the separation membrane comprises a polymerization product of a compound having two or more polymerizable groups, and comprises a lithium ion-conductive compound having at least one group selected from the group consisting of a carbonyl group and a chain ether group, wherein the polymerization product has a weight average molecular weight of 800 or more, and wherein the lithium ion-conductive compound has a molecular weight of 150 or less.

* * * * *